Figure 1:
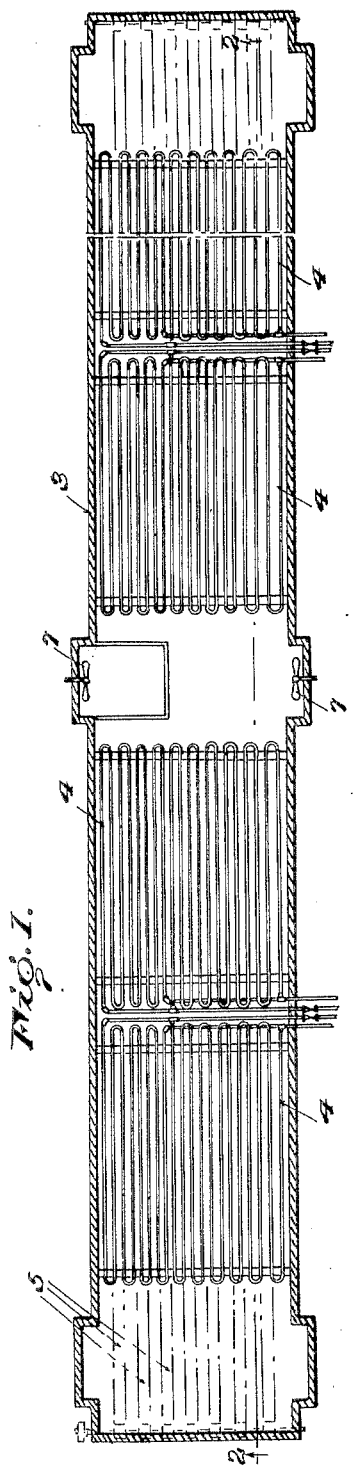

May 3, 1932.  H. L. BORG  1,856,153

PROCESS OF MOLDING CHOCOLATE

Filed Feb. 15, 1927

Inventor
Henry L. Borg,
by Cameron, Kerkam & Sutton
Attorneys

Patented May 3, 1932

1,856,153

UNITED STATES PATENT OFFICE

HENRY L. BORG, OF STAMFORD, CONNECTICUT, ASSIGNOR TO GENERAL FOODS CORPORATION, A CORPORATION OF DELAWARE

PROCESS OF MOLDING CHOCOLATE

Application filed February 15, 1927. Serial No. 168,475.

The present invention relates to making chocolate, and more particularly to the molding of chocolate into blocks or plates whereby the latter may be readily separated from their molds without breaking.

Edible chocolate frequently appears on the market in flat blocks or plates and is commonly made from chocolate "liquor", a solid product derived from the cocoa bean. Milk and sugar are common addition to the chocolate liquor and are incorporated with the latter while in a melted condition. The mixture, after reducing the moisture content, is run into molds and permitted to solidify.

The breakage in separating the chocolate mass from its mold frequently amounts to 15% of the molded product handled. The output is thereby reduced and additional expense incurred in rehandling the broken product. This is particularly true of bran chocolate since the presence of the bran adds to the difficulty of rehandling.

I have been able by my improved process to reduce the breakage in molding chocolate to a negligible quantity and to overcome the above objection.

In order that my invention may be more readily understood, only so much of the old art will be described as is necessary to show the relation of my improvement thereto. In case edible chocolate bars or plates are to be made, chocolate liquor is melted and flavoring materials, sugar and milk are commonly incorporated. Should milk be used, the excess of moisture introduced thereby is removed as far as possible. The resulting mixture, while in a flowable condition, is run into molds resting on an endless carrier. The molds with their contents are passed through a cooling chamber in which the chocolate mass hardens into blocks or plates. As the molds pass out of the cooling chamber into the open space of the room, an attendant separates the plates from the molds. It is at this stage of the molding operation that breakage occurs when the plates refuse to separate from the molds.

My invention is generally applicable to molding chocolate mixtures, wherein the mass largely consists of the solid constituents of the cocoa bean, such as in the commercial chocolate liquor and, broadly stated, resides in rapidly cooling, at a substantially uniform rate, a mass of chocolate in more or less flowable state while in contact with a mold support to congeal the mass into a solid state and then cooling the resulting solid and support to effect relative contraction of said solidified mass from its support, whereby the chocolate and support may be readily separated from each other without breakage of the solidified chocolate.

Chocolate liquor consists in large measure of vegetable fats which are solid at ordinary atmospheric temperatures, and presents a crystalline structure. In my process, rapid cooling of the chocolate as it passes from the fluid to solid state prevents the growth of fat crystals beyond their formative period, i. e., the stearin or cocoa butter is not precipitated or frozen out. The solid particles forming the mass are rendered minute and maintained in close proximity, whereby their cohesive attraction is increased. The uniform rate of cooling tends to produce uniformity of size of the particles and avoids the formation of large masses of stearin crystals at the surface of the mass. In other words, the chocolate mass has been given a physical texture in its solid state whereby it has greater resistance to breakage.

The final cooling of the solidified mass has for its primary object to contract the mass relatively to its mold support. This cooling lends itself to unifying the temperature throughout the mass and, in a way, tempering the mass.

By way of example, I will describe my improvement in its application to making chocolate which in general is a mixture of chocolate liquor, milk and sugar.

The chocolate liquor of commerce or chocolate liquor secured direct from the beans is liquefied at a temperature of about 90° F. to 100° F. and preferably in a disintegrating and emulsifying device to reduce all particles therein to a fine state of division. Milk and sugar are added to this homogenized liquor in suitable proportions not to interfere with the final solidifying of the mass. The mixture is further emulsified at the liquefying temperature.

The resulting chocolate mixture to a depth of about one-eighth inch is flowed into metal molds traveling through a cooling chamber. This chamber is preferably divided into three compartments each provided with means which are controllable for producing the desired temperature in each compartment. With a mixture such as described, the temperature of the mass when introduced into the molds is about 85° F. The atmosphere in the entering compartment is kept at about 55° F. The time occupied for the molds to travel through this compartment is about four minutes when, as in the illustrated example, the thickness of the chocolate cake is about one-eighth of an inch. The temperature of the chocolate is reduced at this stage to about 75° F., a drop of 2.5° per minute. The temperature of the atmosphere in the next following compartment is kept at about 45° F. The time for passage of the molds through this compartment is eight minutes. The temperature of the chocolate is now reduced to about 55° F. which corresponds to a rate of cooling of 2.5° per minute, the same as in the first chamber.

The chocolate is now in a solid state, but there is not at this stage a uniform distribution of temperature between the outside layers and the central portion of the mass. Maximum contraction of the bar or plate of chocolate has therefore not been attained when the molds leave the second compartment. In the last compartment the atmosphere is kept at a low temperature and time permitted for the maximum contraction to take place. About four minutes have been found to be a suitable time for sufficient differential contraction between the chocolate material and the metal mold support, whereby separation of the two may take place without breakage of the chocolate product.

In the illustrative example, the thickness of the molded plates is, on the average, one-eighth of an inch. The molds are of metal and are preferably made of block tin as commonly used in this art.

In carrying out my process, any suitable apparatus may be employed wherein atmospheres at desired temperatures may be maintained and means provided whereby the duration of cooling may be varied.

Figure 2:
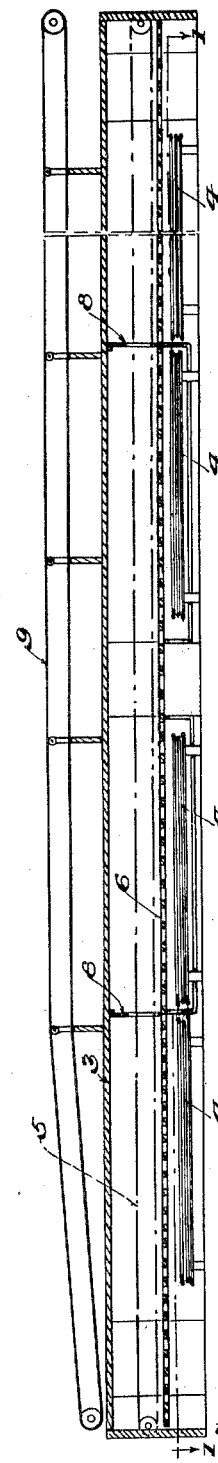

One form of apparatus for carrying out the process of the present invention is diagrammatically illustrated in the accompanying drawings, wherein:

Fig. 1 is a top plan sectional view with parts broken away, illustrating one arrangement of cooling coils; and Fig. 2 is a sectional view taken on the line 2—2 of Fig. 1.

The apparatus preferably includes an insulated casing 3 in the lower portion of which are mounted a plurality of cooling coils 4. The chocolate filled molds are conducted through the casing by means of endless belts 5 which move at a substantially constant rate, and which are driven in any suitable manner. Intermediate the conveyor 5 and the cooling coils is a perforated plate 6 constituting a baffle for the cooling air which may be forced over the cooling coils as by means of fans 7. The casing 3 is divided into three sections or compartments by means of the partitions 8 provided with suitable openings to permit passage of the molds on the conveyor 5. Coils 4 and partitions 8 enable the operator to maintain the desired temperatures throughout the casing. After the tempered chocolate has been removed from the molds the latter may be returned to the filling end of the apparatus by means of an endless belt conveyor 9.

While I prefer to compound the chocolate mass in the manner described whereby a very intimate and uniform mixture is obtained, my process of molding is not limited to any specific chocolate composition, provided the composition is composed largely of the solid constituents of the cocoa bean whether secured from the chocolate liquor of commerce or from the beans direct.

What is claimed is:—

1. The process of molding chocolate into blocks or plates whereby the same may be removed from their molds without breakage, consisting in rapidly cooling at a uniform rate a mass of chocolate while in plastic or flowable state and while in contact with a mold support to a temperature below the solidifying point of said plastic mass and while in said solid state continuing the reduction of temperature for a period of time sufficient to permit contraction of the solidified mass relatively to said support and then separating said mass from its support.

2. The process of molding chocolate into blocks or plates whereby the latter may be removed from their molds without breakage, consisting in conveying a mass of chocolate in plastic or flowable state while in contact with a mold support through atmospheres kept at successively lower temperatures, each below the solidifying temperature of said mass whereby a rapid and uniform rate of cooling is effected to solidfy said mass and then contracting the solid mass relatively to its mold by continuing the reduction of temperature of the mass whereby the molded blocks or plates may be separated from the mold without breaking said plates.

3. In a process of molding chocolate into blocks or plates, the step consisting in rapidly cooling at a uniform rate a mass of chocolate while in plastic or flowable state and while in contact with a mold support to a temperature below the solidifying point of said mass whereby the texture of the chocolate is modified and adapted for removal from its support without breaking 4. The process of molding and tempering chocolate into blocks or plates which consists in introducing said plates into an atmosphere of aproximately 55° F., the blocks when introduced therein having a temperature of approximately 85° F., and conveying said blocks through a plurality of atmospheres, each of which is below the solidifying temperature of the mass, whereby said mass is contracted and the cohesive attraction of the particles forming said mass is increased and the precipitation of fat crystals is prevented.

In testimony whereof I have signed this specification.

HENRY L. BORG.